US008891101B2

(12) United States Patent
Chien

(10) Patent No.: US 8,891,101 B2
(45) Date of Patent: Nov. 18, 2014

(54) PRINTING DEVICE AND METHOD FOR SECURE PRINTING

(75) Inventor: Chin-Hung Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 30 days.

(21) Appl. No.: 13/479,270

(22) Filed: May 24, 2012

(65) Prior Publication Data

US 2012/0307284 A1 Dec. 6, 2012

(30) Foreign Application Priority Data

Jun. 1, 2011 (TW) .............................. 100119138 A

(51) Int. Cl.
*G06K 15/00* (2006.01)
*G06F 3/12* (2006.01)
*G06F 21/42* (2013.01)
*H04L 29/06* (2006.01)
*G06F 21/43* (2013.01)
*H04W 12/06* (2009.01)
*G06F 21/60* (2013.01)

(52) U.S. Cl.
CPC ............. *H04W 12/06* (2013.01); *G06F 3/1238* (2013.01); *H04L 63/0807* (2013.01); *G06F 3/1267* (2013.01); *G06F 3/1222* (2013.01); *G06F 21/42* (2013.01); *G06F 21/43* (2013.01); *G06F 3/1292* (2013.01); *G06F 21/608* (2013.01)
USPC ........................................ 358/1.14; 358/1.15

(58) Field of Classification Search
CPC ....... G06F 21/42; G06F 21/43; G06F 21/608; G06F 3/1222; G06F 3/1238; G06F 3/1267; G06F 3/1292; H04L 63/0807; H04W 12/06
USPC .................................................... 358/1.1–1.9
See application file for complete search history.

(56) References Cited

U.S. PATENT DOCUMENTS

| 6,385,728 | B1* | 5/2002 | DeBry .............................. 726/9 |
| 2003/0099353 | A1* | 5/2003 | Goh et al. ........................ 380/51 |
| 2010/0309503 | A1* | 12/2010 | Partridge et al. ............. 358/1.14 |
| 2010/0309505 | A1* | 12/2010 | Partridge et al. ............. 358/1.15 |

\* cited by examiner

*Primary Examiner* — King Poon
*Assistant Examiner* — Ibrahim Siddo
(74) *Attorney, Agent, or Firm* — Novak Druce Connolly Bove + Quigg LLP

(57) ABSTRACT

A printer is communicatively connected to a terminal and a slave. The printer creates a secure printing group, and allows the terminal and slave to join the secure printing group. The terminal generates a print job, and sends the print job to the printer. The printer generates a first inspection message according to the print job, and sends the first inspection message to the terminal. The terminal selects the slave as a printing delegate, and sends a message that is derived at least in part from the first inspection message to the slave. The slave sends a second inspection message to the printer, wherein the second inspection message is derived at least in part from the message sent from to the terminal to the slave, and requests the printer to execute the print job. The printer executes the print job when the second inspection message matches the first inspection message.

2 Claims, 6 Drawing Sheets

PRINTING DEVICE AND METHOD FOR SECURE PRINTING

BACKGROUND

1. Technical Field

The present disclosure relates to network communications, and more particularly to a printing device for secure printing and a secure printing method using the printing device.

2. Description of Related Art

It is common for a printing device such as a printer to be shared amongst users in a workplace. In a typical situation, multiple users send print jobs from their respective computers to the printing device over a network, and the users personally collect the printed documents from the printing device later on. It is not uncommon for a person who has sent a print job to the printing device to inadvertently pick up another person's printed documents. Sometimes it is desired to print sensitive or confidential information which is not intended to be viewed by other people who have access to the printer. It is a big challenge to provide a secure printing method for the printing device.

BRIEF DESCRIPTION OF THE DRAWINGS

The details of the disclosure, both as to structure and operation, can be best understood by referring also to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-Ray discs, Flash memory, and hard disk drives.

Figure 1:
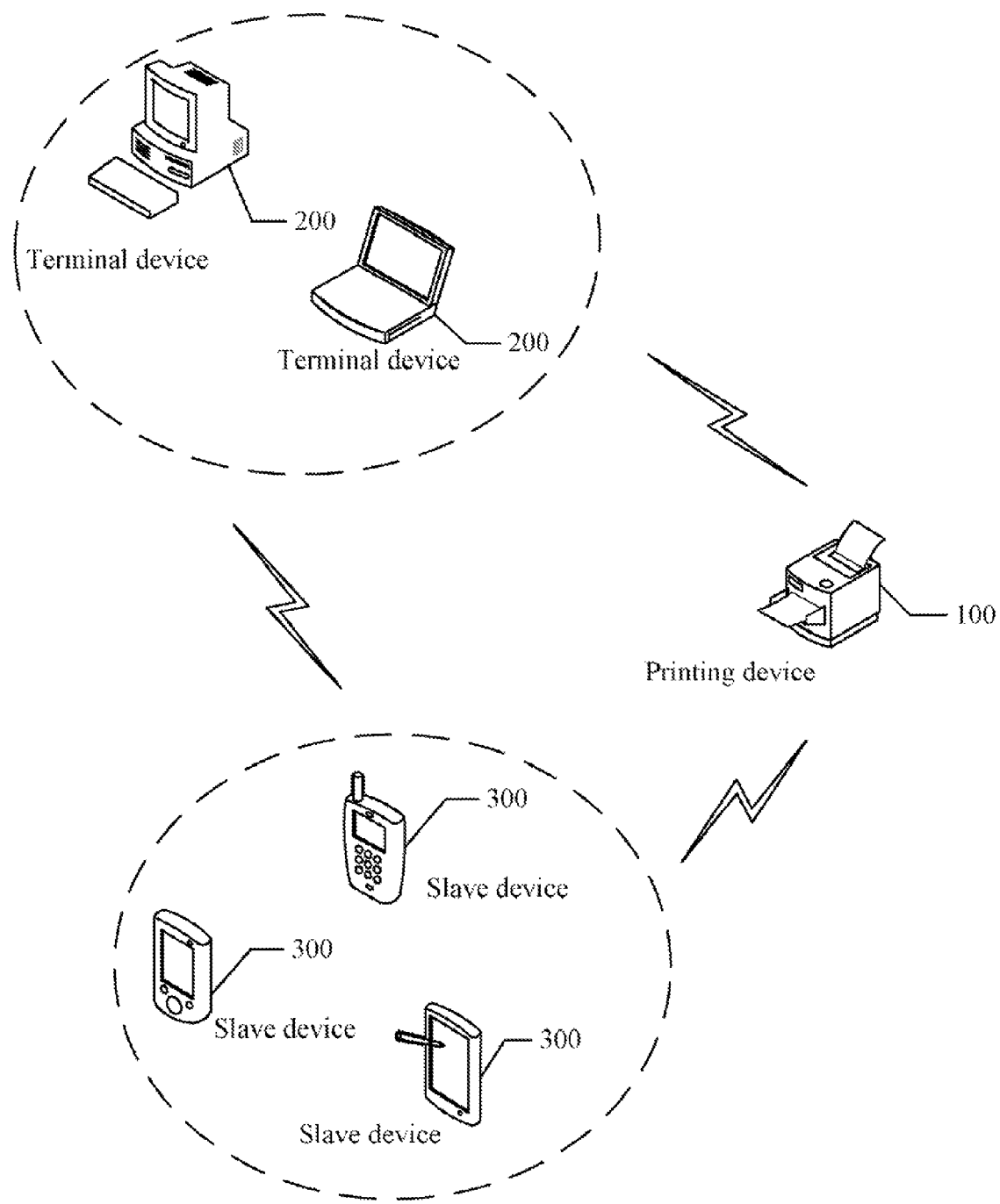
FIG. 1 is a schematic diagram of an application environment of one embodiment of a printing device in accordance with the present disclosure.

FIG. 1 is a schematic diagram of an application environment of one embodiment of a printing device 100 in accordance with the present disclosure. In one embodiment, the printing device 100 is a printer, and may be connected to one or more terminal devices 200 wirelessly or by a wired connection. FIG. 1 shows two terminal devices 200. The printing device 100 wirelessly communicates with one or more slave devices 300, and the terminal devices 200 also wirelessly communicate with the one or more slave devices 300. FIG. 1 shows three slave devices 300. In one embodiment, the printing device 100, the terminal devices 200, and the slave devices 300 may cooperatively construct a wireless local area network (WLAN) based on wireless fidelity (WIFI) technology. The terminal devices 200 may be personal computers, notebook computers, and/or tablet computers, for example. The slave devices 300 may be portable terminals such as mobile phones, smart phones, and/or tablet computers. The slave devices 300 are generally more convenient to carry than the terminal devices 200.

In order to describe the application environment conveniently, unless the context indicates otherwise, only one of the terminal devices 200 and only one of the slave devices 300 are used below to describe one embodiment of a secure printing method of the printing device 100, by way of example.

Figure 2:
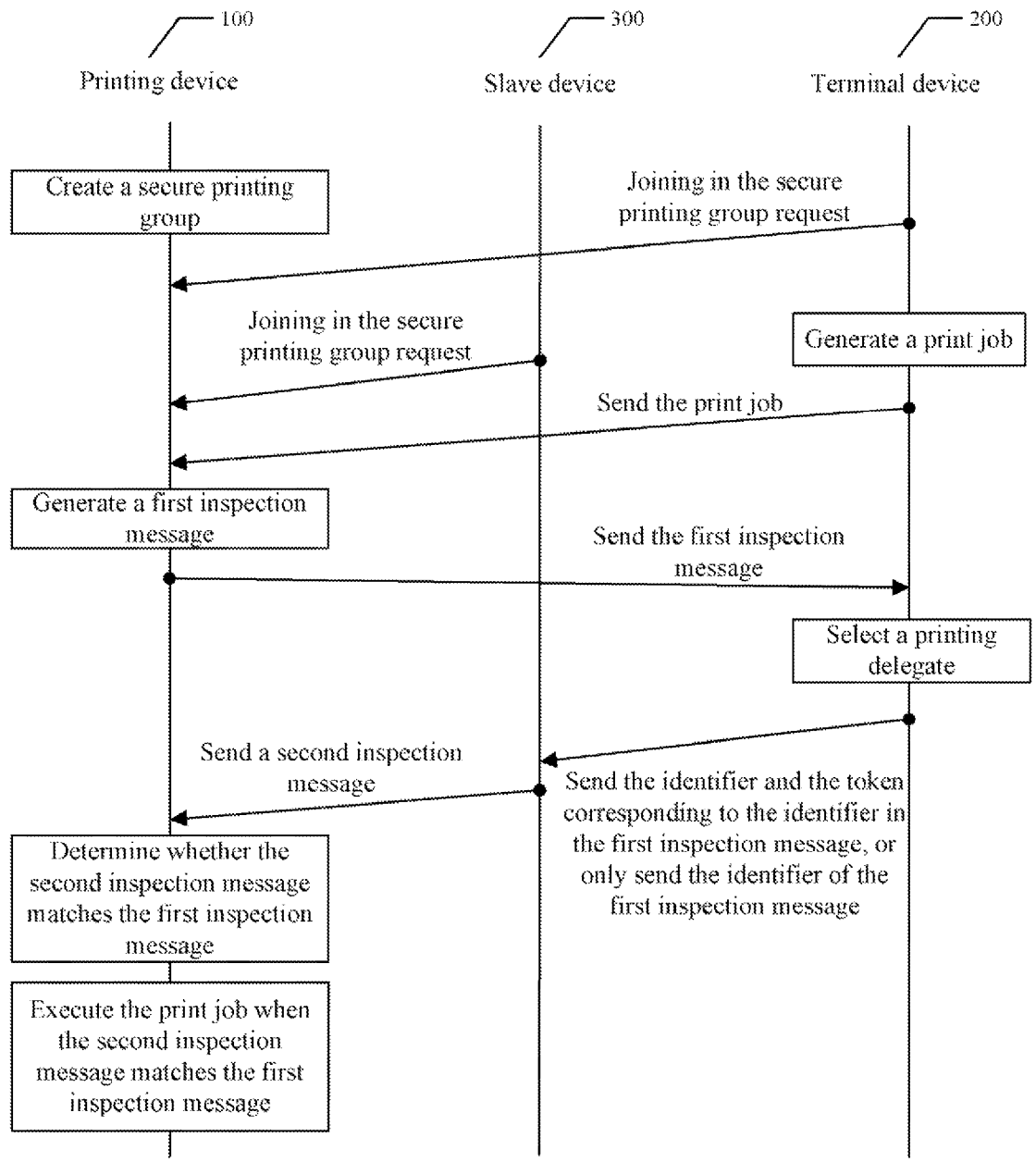
FIG. 2 is a transport diagram of one embodiment of a secure printing method in accordance with the present disclosure.

Referring to FIG. 2, the printing device 100 creates a secure printing group. Subsequently, the printing device 100 allows one terminal device 200 and one slave device 300 to join the secure printing group according to requests of the terminal device 200 and the slave device 300. Then the terminal device 200 generates a print job (i.e., instruction to print), and sends the print job to the printing device 100. The printing device 100 receives the print job from the terminal device 200, generates a first inspection message according to the print job, and sends the first inspection message to the terminal device 200. In one embodiment, the secure printing group comprises a table. The table includes information on the terminal device 200 such as the name and the type of the terminal device 200, and information on the slave device 300 such as the name and the type of the slave device 300. In one embodiment, the first inspection message is a text file that includes a first identifier of the print job and a first token corresponding to the first identifier of the print job. In one example, the first identifier may be the model of the printing device 100, such as HPP2055, or a code of the print job, such as ABC. The first token may be a password that includes any alphanumeric characters among A-Z and 0-9, such as 123.

The terminal device 200 receives the first inspection message from the printing device 100, and selects the slave device 300 in the secure printing group as a printing delegate. The terminal device 200 may send the first identifier and the first token corresponding to the first identifier in the first inspection message to the slave device 300, or only send the first identifier in the first inspection message to the slave device 300. That is, in one embodiment, the slave device 300 is an individual slave device corresponding to the terminal device 200 in the secure printing group. In such embodiment, the slave device 300 only serves the terminal device 200 to request the printing device 100 to execute print jobs, and does not serve the other terminal device(s) 200 in the secure printing group. Alternatively, in another embodiment, the slave device 300 is a public slave device, which serves at least two terminal devices 200 in the secure printing group to request the printing device 100 to execute print jobs.

When the slave device 300 is an individual slave device corresponding to the terminal device 200 in the secure printing group, the slave device 300 operates as follows. The slave device 300 receives from the terminal device 200 the first inspection message, which includes the first identifier of the print job and the first token corresponding to the first identifier of the print job. The slave device 300 subsequently sends a second inspection message to the printing device 100 when a user with the slave device 300 is near the printing device 100. The second inspection message is a text file that includes a second identifier and a second token. The second identifier is the same as the first identifier of the first inspection message, and the second token is the same as the first token of the first inspection message. For example, the first identifier of the first inspection message is ABC, and the first token of the first inspection message is 123. The slave device 300 sends the second inspection message to the printing device 100 when the user with the slave device 300 is near the printing device 100. The second inspection message is ABC123, which includes the second identifier ABC and the second token 123.

When the slave device 300 is a public slave device, a user of the slave device 300 needs to manually enter the first token to the slave device 300. That is, a message sent from the terminal device 200 to the slave device 300 only includes the first identifier of the print job, and does not include the first token. The user views the first token in the terminal device 200, and the user is then able to manually input the first token to the slave device 300. When the user with the slave device 300 is near the printing device 100, the slave device 300 sends a second inspection message to the printing device 100. The second inspection message includes a second identifier and a second token. The second identifier is the same as the first identifier of the first inspection message received from the terminal device 200. The second token is the same as the first token which was manually input by the user. For example, the slave device 300 sends a second inspection message ABC123 to the printing device 100 when the user with the slave device 300 is near the printing device 100. The ABC is derived from the first identifier of the first inspection message received from the terminal device 200. The 123 is derived from the first token received from the user.

The printing device 100 determines whether the second inspection message matches the first inspection message when the printing device 100 receives the second inspection message from the slave device 300. If the second inspection message matches the first inspection message, the printing device 100 executes the print job corresponding to the first inspection message.

Figure 3:
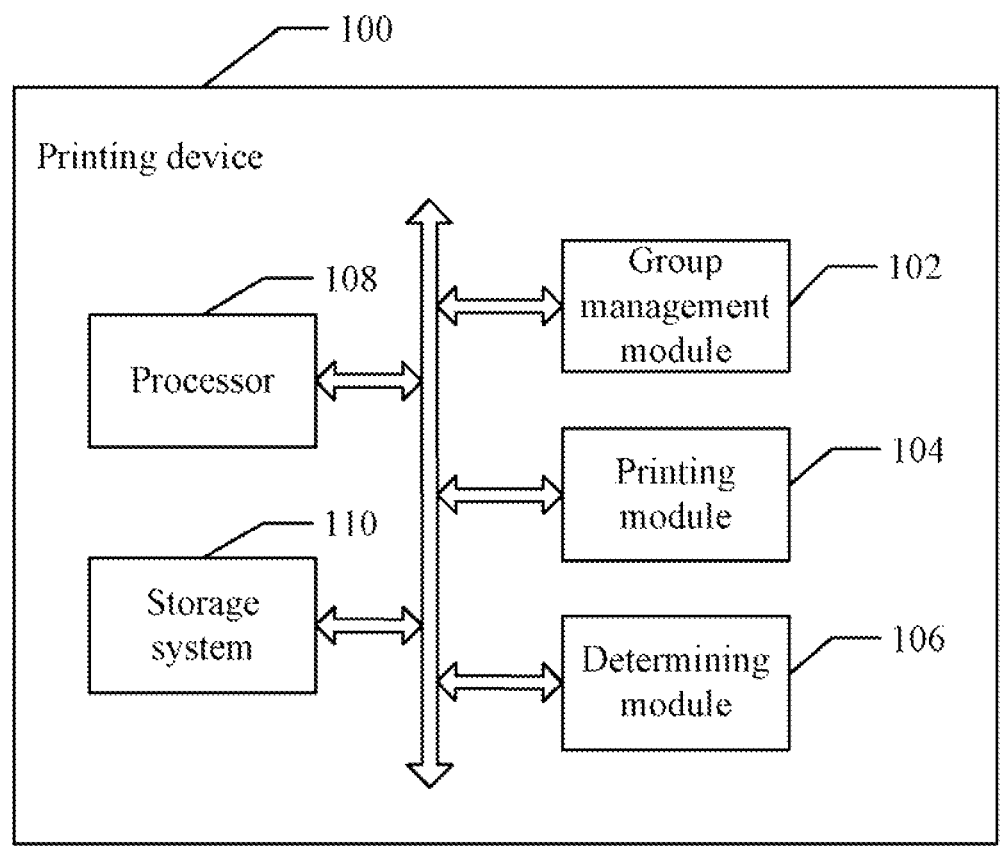
FIG. 3 is a schematic diagram of functional modules of one embodiment of a printing device in accordance with the present disclosure.

FIG. 3 is a schematic diagram of functional modules of one embodiment of a printing device 100 in accordance with the present disclosure. In the embodiment, the printing device 100 includes a group management module 102, a printing module 104, a determining module 106, at least one processor 108 (only one shown), and a storage system 110. The modules 102-106 may include computerized code in the form of one or more programs that are stored in the storage system 110. The computerized code includes instructions that are executed by the at least one processor 108 to provide functions for the modules 102-106. In one example, the storage system 110 may include a hard disk drive, a Flash memory, a cache, or another computerized memory device.

The group management module 102 creates a secure printing group, and in the above-described example, subsequently allows the terminal device 200 and the slave device 300 to join the secure printing group according to requests of the terminal device 200 and the slave device 300.

The printing module 104 receives a print job from the terminal device 200 in the above-described example.

The determining module 106 generates a first inspection message according to the print job, stores the first inspection message in the storage system 110, and sends the first inspection message to the terminal device 200. The determining module 106 further receives a second inspection message from the slave device 300, and determines whether the second inspection message matches the first inspection message that was stored in the storage system 110.

In one embodiment, the printing module 104 executes the print job when the second inspection message matches the first inspection message.

In one embodiment, the first inspection message includes a first identifier of the print job and a first token corresponding to the identifier of the print job, and the second inspection message includes a second identifier of the print job and a second token corresponding to the second identifier of the print job.

In one embodiment, the determining module 106 further determines whether the second identifier and the second token of the second inspection message match the first identifier and the first token of the first inspection message, respectively. The printing module 104 then executes the print job when the second identifier and the second token of the second inspection message match the first identifier and the first token of the first inspection message, respectively. For example, the first identifier of the first inspection message is ABC, and the first token of the first inspection message is 123. The determining module 106 receives the second inspection message from the slave device 300, and determines whether the second identifier of the second inspection message is ABC and whether the second token of the second inspection message is 123. The printing module 104 executes the print job when the second identifier of the second inspection message is ABC and the second token of the second inspection message is 123. If the second identifier of the second inspection message is not ABC or the second token of the second inspection message is not 123, the printing module 104 deletes the print job.

Figure 4:
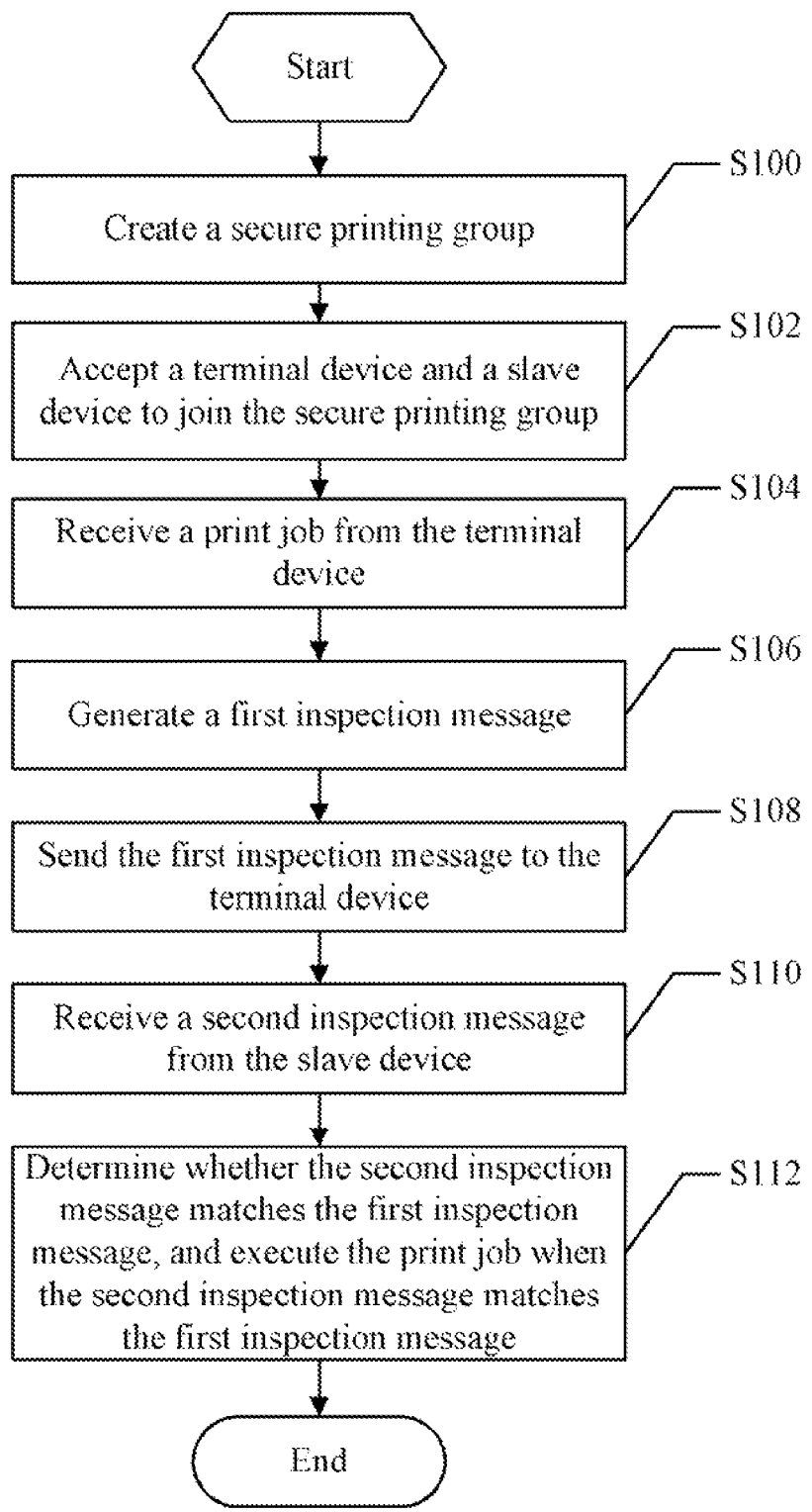
FIG. 4 is a flowchart of one embodiment of a secure printing method in accordance with the present disclosure.

FIG. 4 is a flowchart of one embodiment of a secure printing method in accordance with the present disclosure. The method may be embodied in the printing device 100, and is executed by functional modules such as those of FIG. 3.

In step S100, the group management module 102 of the printing device 100 creates a secure printing group.

In step S102, the group management module 102 of the printing device 100 receives requests to join the secure printing group from a terminal device 200 and a slave device 300. Then the group management module 102 allows the terminal device 200 and the slave device 300 to join the secure printing group according to the requests.

In step S104, the printing module 104 of the printing device 100 receives a print job from the terminal device 200.

In step S106, the determining module 106 of the printing device 100 generates a first inspection message according to the print job.

In step S108, the determining module 106 of the printing device 100 sends the first inspection message to the terminal device 200.

In step S110, the determining module 106 of the printing device 100 receives a second inspection message from the slave device 300.

In step S112, the determining module 106 of the printing device 100 determines whether the second inspection message matches the first inspection message, and the printing module 104 of the printing device 100 executes the print job when the second inspection message matches the first inspection message. In one embodiment, the first inspection message includes a first identifier of the print job and a first token corresponding to the first identifier of the print job, and the second inspection message includes a second identifier of the print job and a second token corresponding to the second identifier of the print job. The printing module 104 executes the print job when the second identifier and the second token of the second inspection message match the first identifier and the first token of the first inspection message, respectively.

Figure 5:
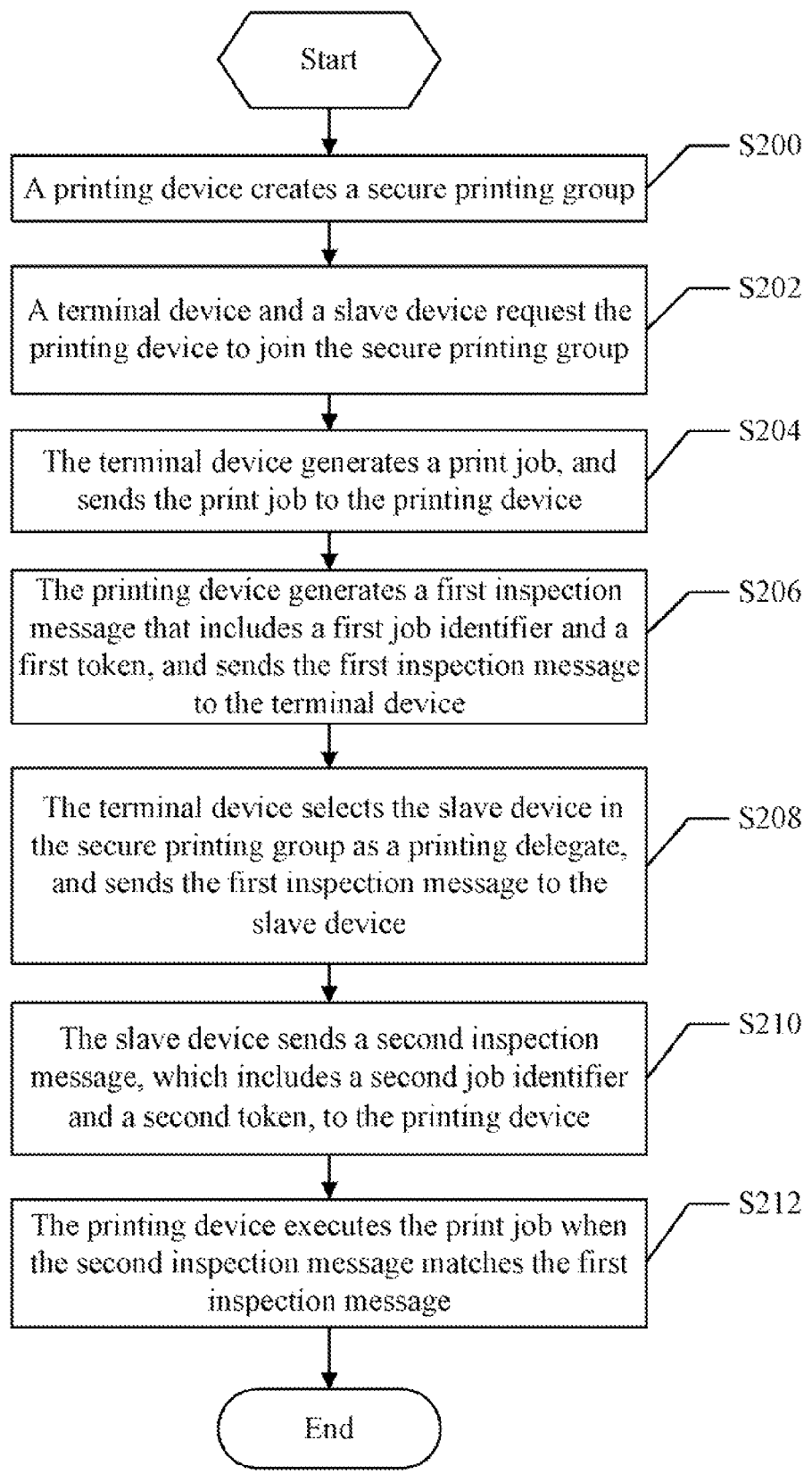
FIG. 5 is a flowchart of another embodiment of a secure printing method in accordance with the present disclosure.

FIG. 5 is a flowchart of another embodiment of a secure printing method in accordance with the present disclosure.

In step S200, the printing device 100 creates a secure printing group.

In step S202, a terminal device 200 and a slave device 300 request the printing device 100 to join the secure printing group. Then the printing device 100 allows the terminal device 200 and the slave device 300 to join the secure printing group according to the requests.

In step S204, the terminal device 200 generates a print job, and sends the print job to the printing device 100.

In step S206, the printing device 100 generates a first inspection message according to the print job when the printing device 100 receives the print job from the terminal device 200, and sends the first inspection message to the terminal device 200. In one embodiment, the first inspection message includes a first identifier of the print job and a first token corresponding to the first identifier of the print job.

In step S208, the terminal device 200 selects the slave device 300 in the secure printing group as a printing delegate, and sends the first inspection message to the slave device 300. The first inspection message includes the first identifier of the print job and the first token corresponding to the first identifier of the print job.

In step S210, the slave device 300 sends the second inspection message to the printing device 100 and requests the printing device 100 to execute the print job when the user with the slave device 300 is near the printing device 100, wherein the second inspection message is the same as the first inspection message that was received by the slave device 300 in step S208.

In step S212, the printing device 100 compares the second inspection message and the first inspection message, and executes the print job when the second inspection message matches the first inspection message. Thus, the printing device 100 may successfully ensure the security of the print job.

Figure 6:
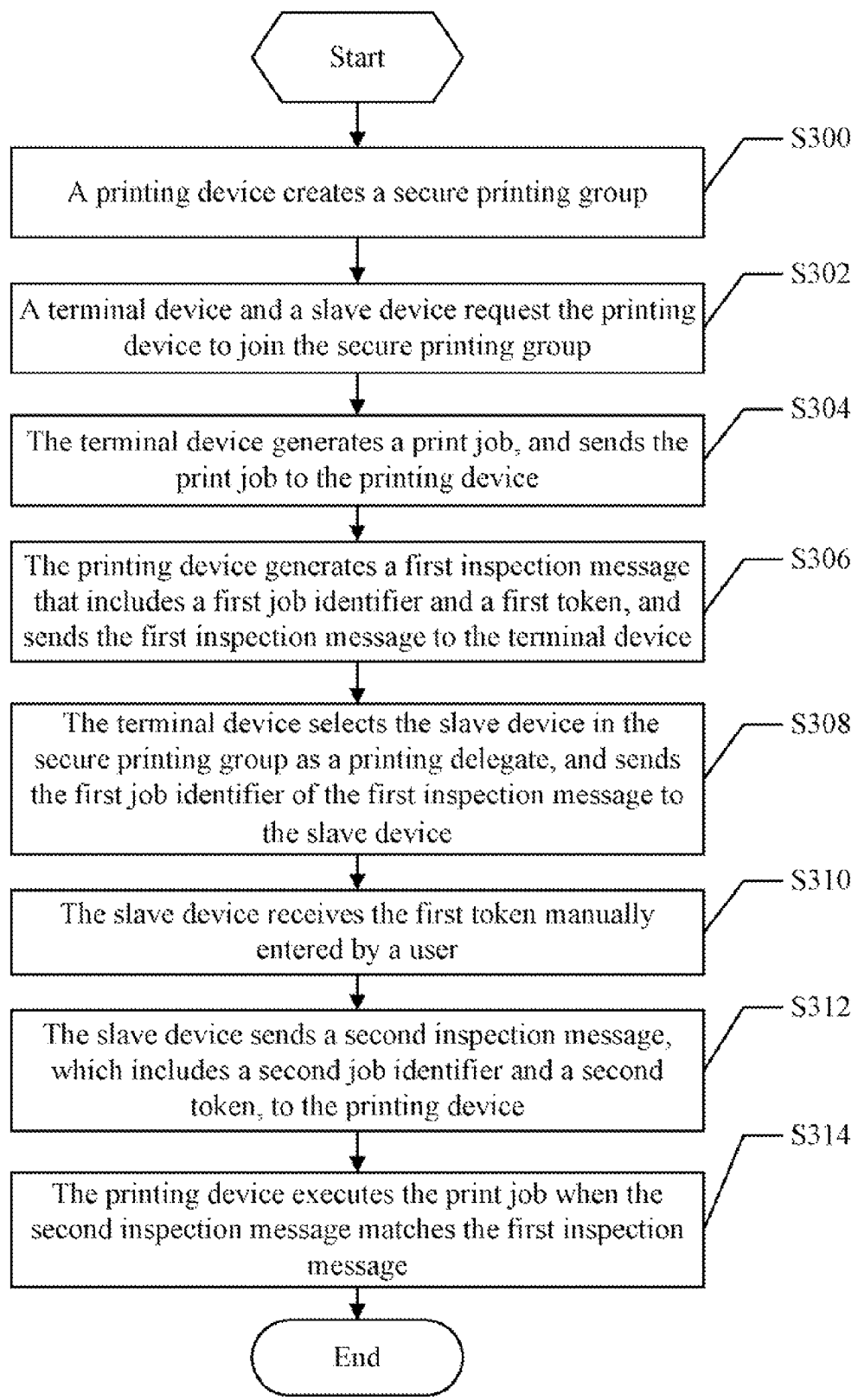
FIG. 6 is a flowchart of a further embodiment of a secure printing method in accordance with the present disclosure.

FIG. 6 is a flowchart of a further embodiment of a secure printing method in accordance with the present disclosure. In one embodiment, steps S300-306 are the same as steps S200-S206 shown in FIG. 5 and described above. Thus for the sake of brevity, steps S300-306 are not described in detail herein.

In step S308, the terminal device 200 selects the slave device 300 in the secure printing group as a printing delegate, and sends the first identifier of the print job of the first inspection message to the slave device 300.

In step S310, the slave device 300 receives the first token manually entered by a user.

In step S312, the slave device 300 sends a second inspection message to the printing device 100 when the user with the slave device 300 is near the printing device 100, and sends a request to the printing device 100 to execute the print job. In one embodiment, the second inspection message includes a second identifier of the print job and a second token corresponding to the second identifier of the print job. The second identifier of the second inspection message is the same as the first identifier of the first inspection message which was received by the slave device 300 in step 308. The second token of the second inspection message is the same as the first token that was received by the slave device 300 in step 310.

In step S314, the printing device 100 compares the second inspection message and the first inspection message, and executes the print job when the second inspection message matches the first inspection message. Thus, the printing device 100 may successfully ensure the security of the print job.

While various embodiments and methods of the present disclosure have been described above, it should be understood that they have been presented by way of example only and not by way of limitation. Thus the breadth and scope of the present invention should not be limited by the above-described embodiments, but should be defined only in accordance with the following claims and their equivalents.

What is claimed is:

1. A secure printing method of a terminal device and a slave device communicatively connected to a printing device, the secure printing method comprising:

the printing device creating a secure printing group;
the terminal device and the slave device requesting the printing device to join the secure printing group;
the printing device allowing the terminal device and the slave device to join the secure printing group;
the terminal device generating a print job, and sending the print job to the printing device;
the terminal device receiving a first inspection message from the printing device;
the terminal device selecting the slave device in the secure printing group as a printing delegate, and sending a message to the slave device, wherein the message to the slave device is derived at least in part from the first inspection message;
the slave device sending a second inspection message to the printing device when the slave device is near the printing device, and requesting the printing device to execute the print job, wherein the second inspection message is derived at least in part from the message sent from the terminal device to the slave device;
wherein the first inspection message comprises a first identifier of the print job and a first token corresponding to the first identifier of the print job, and the second inspection message comprises a second identifier of the print job and a second token corresponding to the second identifier of the print job;
wherein the terminal device sending a message to the slave device comprises the terminal device sending only the first identifier of the print job to the slave device and a user entering the first token of the print job to the slave device;
the printing device determining whether the second inspection message matches the first inspection message; and
the printing device executing the print job on a condition that the second inspection message matches the first inspection message.

2. The secure printing method as described in claim 1, wherein the printing device determining whether the second inspection message matches the first inspection message comprises the printing device determining whether the second identifier and the second token of the second inspection message match the first identifier and the first token of the first inspection message, respectively.

* * * * *